US012623251B2

(12) United States Patent
Biggs et al.

(10) Patent No.: US 12,623,251 B2
(45) Date of Patent: May 12, 2026

(54) METHOD OF MAKING STAINLESS STEEL REFRIGERATION APPLIANCE AND PAINTED STAINLESS STEEL REFRIGERATION APPLIANCE

(71) Applicant: True Manufacturing Co., Inc., O'Fallon, MO (US)

(72) Inventors: Alyssa Biggs, O'Fallon, MO (US); Steven Trulaske, O'Fallon, MO (US)

(73) Assignee: TRUE MANUFACTURING CO., INC., O'Fallon, MO (US)

( * ) Notice: Subject to any disclaimer, the term of this patent is extended or adjusted under 35 U.S.C. 154(b) by 0 days.

(21) Appl. No.: 18/423,684

(22) Filed: Jan. 26, 2024

(65) Prior Publication Data

US 2024/0278281 A1 Aug. 22, 2024

Related U.S. Application Data

(60) Provisional application No. 63/481,882, filed on Jan. 27, 2023.

(51) Int. Cl.

| | |
|---|---|
| ***B05D 7/14*** | (2006.01) |
| ***B05D 1/32*** | (2006.01) |
| ***B05D 3/12*** | (2006.01) |
| ***B05D 7/00*** | (2006.01) |

(52) U.S. Cl.

CPC ................. *B05D 7/14* (2013.01); *B05D 1/32* (2013.01); *B05D 3/12* (2013.01); *B05D 7/574* (2013.01); *B05D 2202/15* (2013.01); *B05D 2350/38* (2013.01)

(58) Field of Classification Search

None

See application file for complete search history.

(56) References Cited

U.S. PATENT DOCUMENTS

2005/0160077 A1* 7/2005 Howes ............... G06Q 30/0635
2009/0019648 A1* 1/2009 Jones ................. G06Q 30/0601 705/26.1
2019/0017130 A1* 1/2019 Preddy .................... B44C 1/224
(Continued)

OTHER PUBLICATIONS

"How to Paint Stainless Steel Appliances" published by PMQ for Two at https://www.pmqfortwo.com/how-to-paint-stainless-steel-appliances/ on Jun. 7, 2019.*
(Continued)

*Primary Examiner* — Michael P. Rodriguez
(74) *Attorney, Agent, or Firm* — Stinson LLP

(57) ABSTRACT

A method of making a made-to-order color matched stainless steel refrigeration appliance includes formulating a color-formulated liquid paint to match a specified color, and preparing a prefabricated stainless steel refrigeration appliance for being painted at a production facility remote from a purchaser before shipping the prefabricated stainless steel refrigeration appliance to the purchaser. Moreover, the method includes painting decorative stainless steel surfaces of the prefabricated stainless steel refrigeration appliance at the production facility with liquid-applied primer, liquid-applied color-formulated paint, and liquid-applied clear coat. Lastly, the painted stainless steel refrigeration appliance is packaged to prepare the painted stainless steel refrigeration appliance for shipment to the purchaser.

19 Claims, 10 Drawing Sheets

(56) References Cited

U.S. PATENT DOCUMENTS

| | | | | |
|---|---|---|---|---|
| 2020/0024747 | A1* | 1/2020 | Myers | C21D 9/56 |
| 2021/0102842 | A1* | 4/2021 | Wei | G06T 11/001 |

OTHER PUBLICATIONS

"Design your Dream Range, Vent Hood, and Refrigerator" published by BlueStar at https://www.bluestarcooking.com/inspiration/build-your-own/ as of Jan. 23, 2022.*

* cited by examiner

1000

METHOD OF MAKING STAINLESS STEEL REFRIGERATION APPLIANCE AND PAINTED STAINLESS STEEL REFRIGERATION APPLIANCE

CROSS-REFERENCE TO RELATED APPLICATION

This application claims the benefit of U.S. Provisional Application No. 63/481,882, filed Jan. 27, 2023.

FIELD

This disclosure generally pertains to a method of making a stainless steel refrigeration appliance and painted stainless steel refrigeration appliances.

BACKGROUND

Stainless steel refrigeration appliances, such as stainless steel refrigerators, freezers, combination refrigerator/freezers, and ice makers, are widely used in residential and commercial settings. Occasionally the purchaser of a stainless steel refrigeration appliance prefers a color finish to the standard polished stainless steel finish. Conventionally, high end manufacturers provide a limited number of powder-coated color finishes for stainless steel refrigeration appliances. Powder-coated finishes are formed by powder coating individual parts of the appliance on a dedicated powder coating line before final assembly.

SUMMARY

In one aspect, a method of making a stainless steel refrigeration appliance comprises formulating a color-formulated liquid paint to match a specified color. A prefabricated stainless steel refrigeration appliance is prepared for being painted at a production facility remote from a purchaser before shipping the prefabricated stainless steel refrigeration appliance to the purchaser. Decorative stainless steel surfaces of the prefabricated stainless steel refrigeration appliance are painted at the production facility with the color-formulated liquid paint. The painted stainless steel refrigeration application is readied for shipment to the purchaser.

In another aspect, a production stainless steel refrigeration appliance comprises a plurality of decorative stainless steel surfaces, liquid-applied primer on the decorative stainless steel surfaces, liquid-applied color-formulated paint on the liquid-applied primer, liquid-applied clear coat on the liquid-applied color-formulated paint, and removable packing for shipment to a primary purchaser of the production stainless steel refrigeration appliance.

Other objects and features will be in part apparent and in part pointed out hereinafter.

BRIEF DESCRIPTION OF THE DRAWINGS

Corresponding parts are given corresponding reference characters throughout the drawings.

DETAILED DESCRIPTION

The inventors desire to provide stainless steel refrigeration appliances that are prefabricated to have custom, one-off, made-to-order colors matched to a customer's specification. The inventors believe that the conventional powder coating process is not well-suited to made-to-order color matching. The powder coating process requires a dedicated coating line for coating individual parts before assembly. Any made-to-order color matching program must accommodate frequent color changes, and changing colors in a powder coating line is a cumbersome, time-consuming process. Furthermore, the powder for powder coating is sold in minimum units of 50 pounds. For a custom color that is only used on one appliance, most of the 50 pounds of powder will go to waste. Additionally, it is difficult and time consuming to formulate powders to match a customer's specification. Lastly, the inventors have recognized that high-end refrigeration appliances are increasingly used as decorative showpieces for the end customer. Powder-coated stainless steel has an inherent texture that may not meet every customer's expectations for a premium showpiece.

Figure 1:
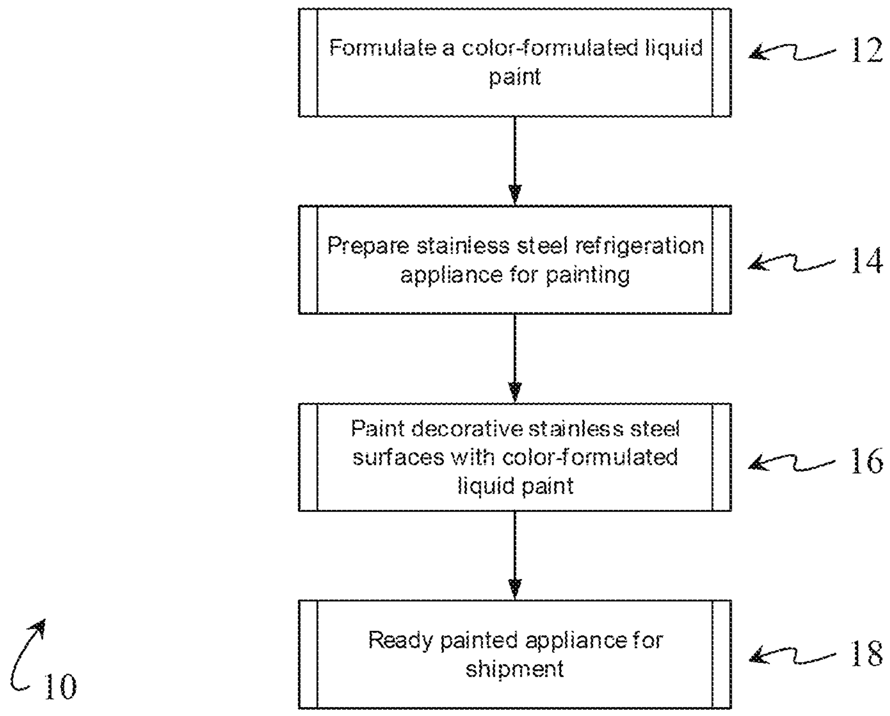
FIG. 1 is a flow chart illustrating sequential processes in an exemplary method of making a stainless steel refrigeration appliance in accordance with the present disclosure.

Referring to FIG. 1, the inventors have developed a new method of making made-to-order color-matched stainless steel refrigeration appliances, which is generally indicated at reference number 10. Though powder coating is a suitable solution for many colored stainless steel appliances, the inventors believe that the method 10 overcomes the drawbacks of conventional powder coating color processes identified above. The method 10 is generally carried out in a series of four processes 12, 14, 16, 18. In the first process 12, a liquid paint is formulated to match a specified color. In the second process 14, a prefabricated stainless steel refrigeration appliance is prepared for painting. In the third process 16, the decorative stainless steel surfaces of the prefabricated stainless steel refrigeration appliance are painted. And in the final process 16, the painted appliance is readied for shipment to the purchaser. In an exemplary embodiment, the method 10 is a production method carried out at a production facility remote from the purchaser. In these embodiments, the production method 10 is carried out before delivering the appliance to the first purchaser in the primary market. Upon completion of the method 10, the painted appliance is shipped from the production facility to the purchaser-who is typically the first owner to possess the appliance after it is released from production.

Figure 2:
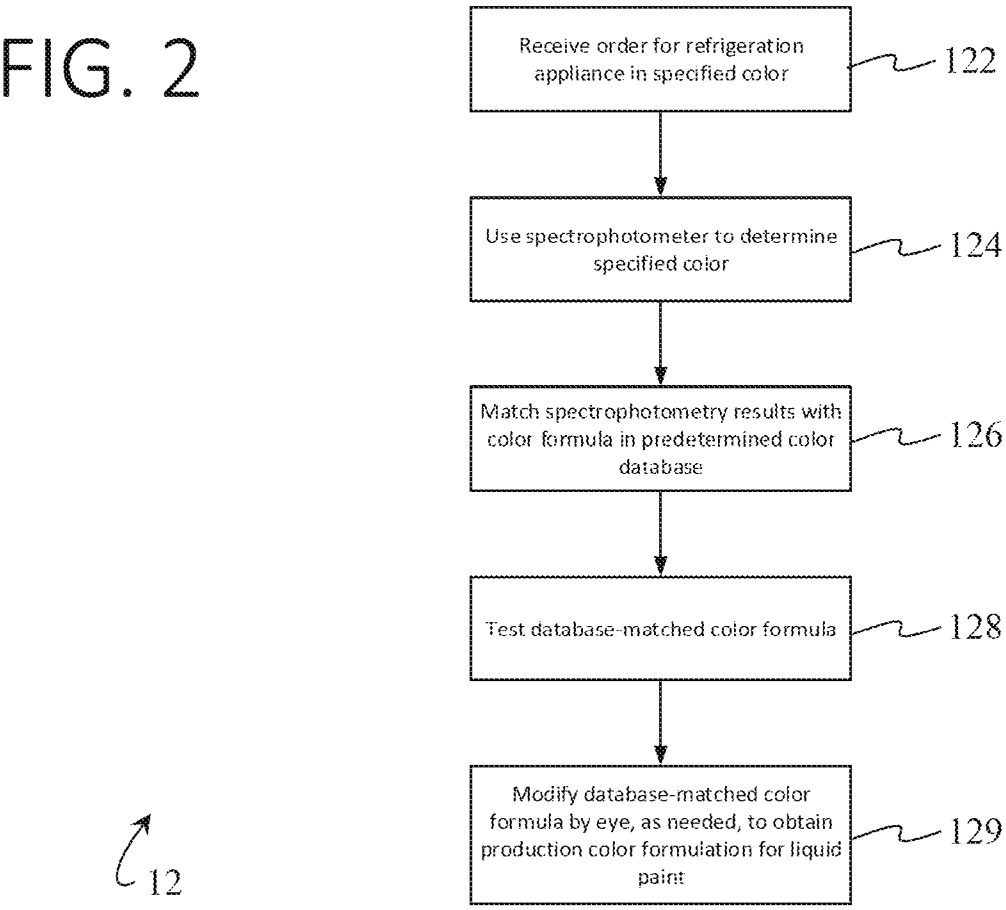
FIG. 2 is a flow chart of a process of the method of FIG. 1 for formulating a color-formulated liquid paint.

Referring to FIG. 2, an exemplary process for formulating a color-formulated liquid paint for a stainless steel refrigeration appliance is generally indicated at reference number 12. The process 12 begins when a production facility receives an order for a refrigeration appliance in a specified color (step 122). In some cases, the specified color might be a known liquid paint color (e.g., an automotive paint color). But it is envisioned that, oftentimes, the color will be specified by providing a color sample. For example, a customer might provide a sample of a countertop or cabinet color and specify that the color of the refrigeration appliance is to be matched to the sample article.

Where a color sample is provided, the process 12 suitably includes steps 124, 126 for using an automated color-matching system to determine an automated color-matched formula for the liquid paint based on the color sample. An exemplary automated color-matching system is the ColorNet software system from Axalta Coatings. In step 124, a color spectrophotometer is used to precisely determine the color of the sample, and in step 126, the spectrophotometrically determined color is matched to a predetermined color formula stored in a color database, such as the ColorNet database. This provides the automated color-matched formula for the liquid paint.

Preferably, after determining the automated color-matched formula in step 126, the manufacturer mixes a small test amount of the automated color-matched formula and applies it to a test chip to obtain a test sample of the automated color-matched formula. Then the manufacturer evaluates the test sample of the automated color-matched formula by eye (step 128). If needed, the manufacturer manually adjusts the automated color-matched formula to better match the customer's color sample. The formula is adjusted by eye until a well-matched production color formulation is found (step 129).

Figure 3:
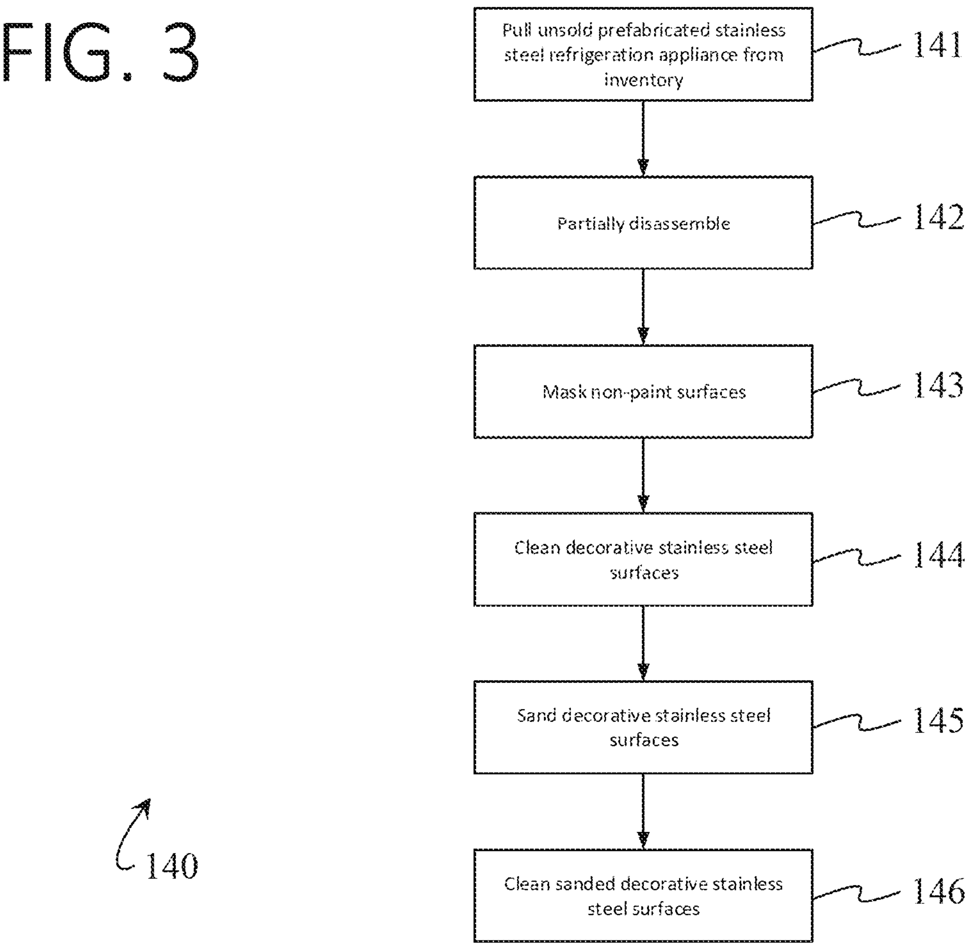
FIG. 3 is a flow chart of a process of the method of FIG. 1 for preparing a prefabricated stainless steel refrigeration appliance for painting.

Referring to FIG. 3, an exemplary process of preparing a stainless steel refrigeration appliance for painting is generally indicated at reference number 140. In the illustrated embodiment, the process 140 comprises pulling an unsold, prefabricated stainless steel refrigeration appliance from the manufacturer's stock inventory (step 141). In other words, the stainless steel refrigeration appliance has been fully assembled and placed into normal inventory prior to painting. Starting the process with a prefabricated appliance allows the manufacturer to quickly fulfill custom orders for appliances in made-to-order colors. There is no disruption to the production line for the refrigeration appliance. By contrast, the conventional powder coating process applies color powder to individual parts of the appliance in the production line before assembly. Any customization of color would require a disruption in the production line as the powder coating line is switched from one color to the next.

Figure 6:
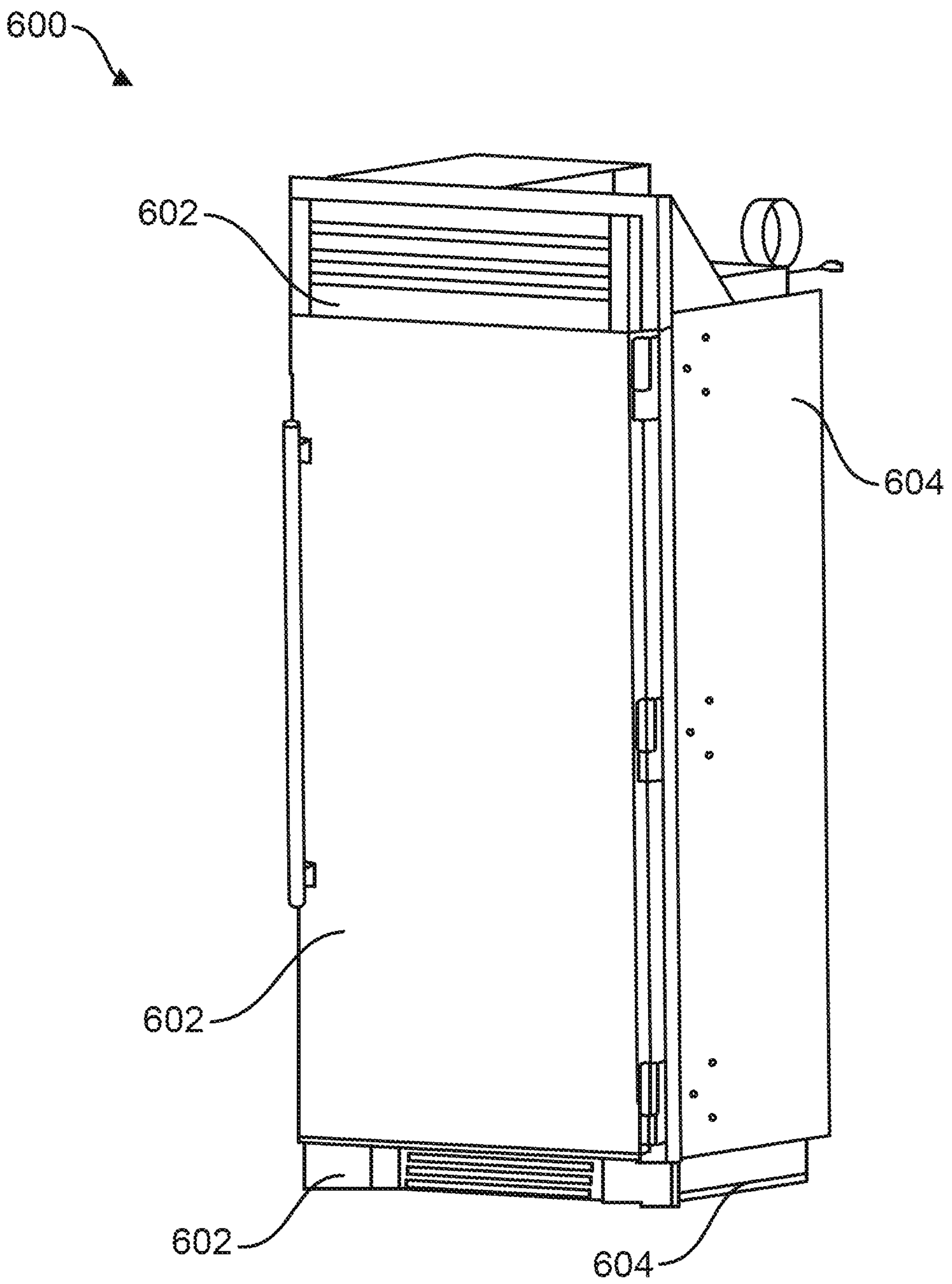
FIG. 6 is a perspective of an unpainted stainless steel column refrigerator.

FIG. 6 provides an illustrative example of a stainless steel refrigeration appliance 600 of the type that could be pulled from inventory in step 141 of process 140. The illustrated stainless steel refrigeration appliance 600 is a column refrigerator, but it will be understood that all types of stainless steel refrigeration appliances could be manufactured in accordance with the manufacturing method 10. The refrigerator 600 comprises decorative stainless steel surfaces 602. In the stock form of the refrigerator 600, the decorative stainless steel surfaces 601 are polished stainless steel. In the illustrated embodiment, the decorative stainless steel surfaces 602 include the door, a front cabinet face, a kick plate, a rain shield, and a cabinet header. All other exposed surfaces on the refrigerator 600 are considered "non-paint" surfaces 604 because they are not subject to painting in the method 10. In the illustrated embodiment, the side panels of the refrigerator 600 are non-paint surfaces 604 because the illustrated refrigerator is configured for built-in installation. But it will be understood that in other embodiments, the side panels could be decorative stainless steel panels subject to painting.

Figure 7:
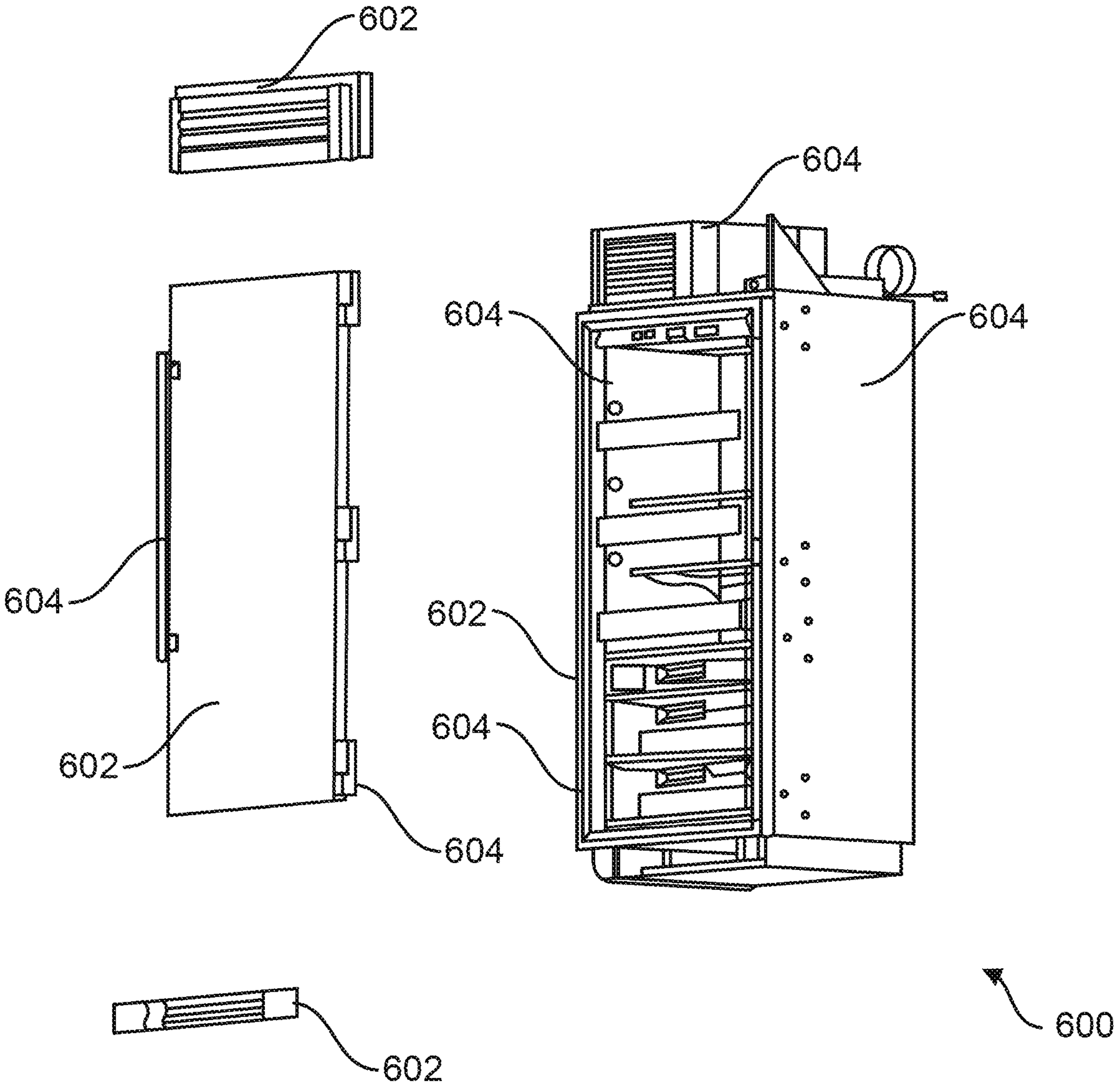
FIG. 7 is an exploded perspective the refrigerator of FIG. 6 showing the refrigerator partially disassembled for painting.

Referring again to FIG. 3, after pulling the prefabricated stainless steel refrigeration appliance from inventory, the next step in the preparation process 140 is to partially disassemble the unit (see FIG. 7). For the refrigerator 600, this step comprises removing the door (including hinges and handle), kick plate, rain shield and cabinet header, but leaving all components of the refrigeration system (e.g., compressor, condensing unit, evaporator, evaporator fan, refrigerant expansion device) intact. Interior lights, displays, water plumbing for ice makers, etc., are all also typically kept assembled during a partial disassembly step performed in accordance with this disclosure. Depending on how the door is constructed, the hinges and handle may be removed from the door prior to painting.

After partially disassembling the appliance, in step 143, the manufacturer masks all non-paint surfaces so that liquid paint spray is not applied to the non-paint surfaces. If the handle and hinges remain attached to the door, these components are masked during step 143. The plastic liner on the interior side of the door is masked. In addition, step 143 comprises masking the interior of the cabinet, as well as the plastic thermal breaker along the inner corner of the door frame. Any non-paint side panels or exposed parts of the refrigeration system are also masked during step 143. The inventors have found that 3M green masking tape and masking paper works well for masking the non-paint surfaces of a stainless steel refrigeration appliance. A squeegee may be used to apply the tape, particularly along sharp corners.

After masking the non-paint surfaces, the process 140 next comprises an initial cleaning step 144. During the initial cleaning step 144 the decorative stainless steel surfaces are cleaned using a suitable cleaning solution. The inventors have found that it is effective to apply the Axalta two-step process cleaner in accordance with manufacturer's instructions. After applying the cleaning solution, the decorative stainless steel surfaces are wiped with a clean, lint-free, dry rag.

After the initial cleaning step 144, the manufacturer next sands the decorative stainless steel surfaces in step 145. Suitably, a technician can use an automatic sander to sand accessible surfaces and hand sand any surface regions that are not accessible with the automatic sander. The inventors have found that a single sanding with 180-grit sand paper efficiently achieves a desired surface finish.

After sanding in step 145, the process 140 comprises a final cleaning step 146. During the final cleaning step 146 the decorative stainless steel surfaces are again cleaned using a suitable cleaning solution. The Axalta two-step process cleaner can again be used in accordance with manufacturer's instructions. After applying the cleaning solution, the decorative stainless steel surfaces are wiped with a clean, lint-free, dry rag. Finally, the manufacturer should inspect the masking tape to ensure it is still properly adhered to the non-paint surfaces.

Figure 4:
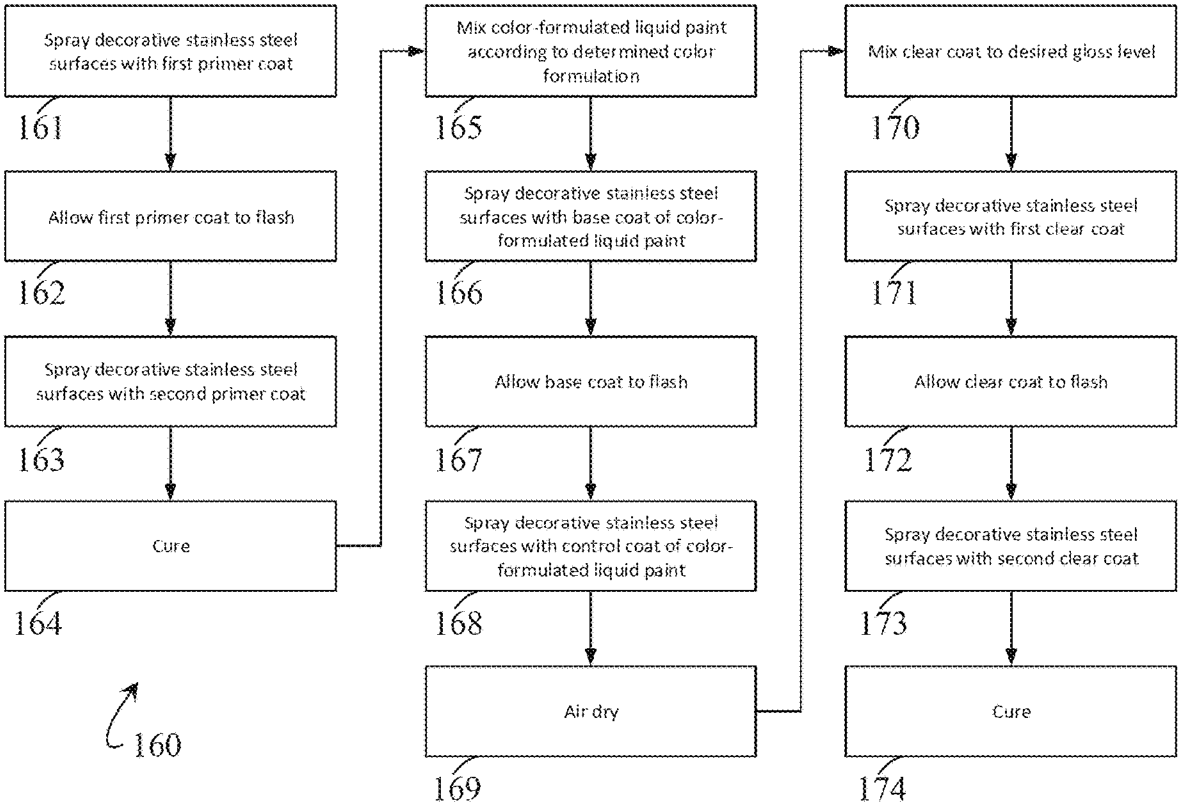
FIG. 4 is a flow chart of a process of the method of FIG. 1 for painting decorative stainless steel surfaces of the prefabricated stainless steel refrigeration appliance.

Referring to FIG. 4, an exemplary process for painting the stainless steel refrigeration appliance is generally indicated at reference number 160. The process 160 broadly comprises three sequential sub-processes: priming (steps 161-164); painting (steps 165-169); and clear coating (step 170-174). These steps are preferably conducted inside a dedicated spray booth at the production facility. Suitable spray booths are sold by Spray Systems Inc., of Pomona, CA.

The priming sub-process begins by spraying the decorative stainless steel surfaces with a first coat of liquid primer in step 161. After the first coat of primer is sprayed, the manufacturer waits for a defined period of time (e.g., ten minutes) to allow the first coat of primer to flash off (step 162). After flashing off, the manufacturer sprays a second coat of liquid primer in step 163. Then the manufacturer cures the primer in step 164. Preferably, the primer is cured in a heated environment for a relatively short period of time. For example, in one or more embodiments, the spray booth can be heated to an internal temperature of greater than 120° F. for curing. In one exemplary embodiment, the primer is an Axalta Corlar Epoxy Primer cured at about 140° F. for about 40 minutes.

After priming, the painting sub-process begins at step 165 by mixing the color-formulated liquid paint in accordance with the production color formulation determined in process 120. Suitable formulations may comprise CromaxEZ waterborne toners. When the color-formulated liquid paint is obtained, the manufacturer sprays the (now-primed) decorative stainless steel surfaces with a base coat of liquid paint in step 166. After the first coat of paint is sprayed, the manufacturer waits for a defined period of time (e.g., fifteen minutes) to allow the first coat of paint to flash off (step 167). After flashing off, the manufacturer sprays a second coat of liquid paint in step 168. Then the manufacturer allows the paint to air-dry at ambient conditions for 35-45 minutes.

After painting and air-drying, the clear coating sub-process begins by mixing the clear coat formulation to a desired gloss level (step 170). Typically, it is envisioned that the gloss level would be specified by the customer from among a plurality of manufacturer-provided options. After mixing the clear coat, the manufacturer sprays on a first coat of liquid clear coat in step 171. After the first clear coat is sprayed, the manufacturer waits for a defined period of time (e.g., fifteen minutes) to allow the first clear coat layer to flash off (step 172). After flashing off, the manufacturer sprays a second liquid clear coat layer in step 173. Then the manufacturer cures the clear coat in step 174. Preferably, the clear coat is cured in a heated environment for a relatively short period of time. For example, in one or more embodiments, the spray booth can be heated to an internal temperature of greater than 120° F. for curing. In one exemplary embodiment, the clear coat is cured at about 140° F. for about 40 minutes.

Figure 5:
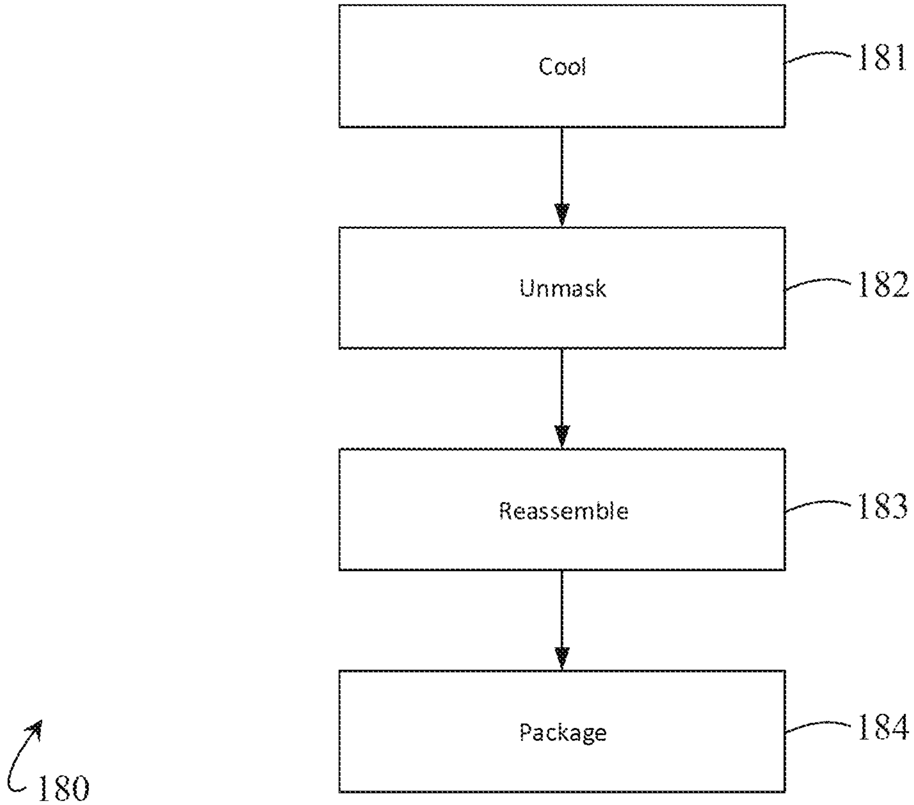
FIG. 5 is a flow chart of a process of the method of FIG. 1 for readying a painted stainless steel appliance for shipment.
Figure 8:
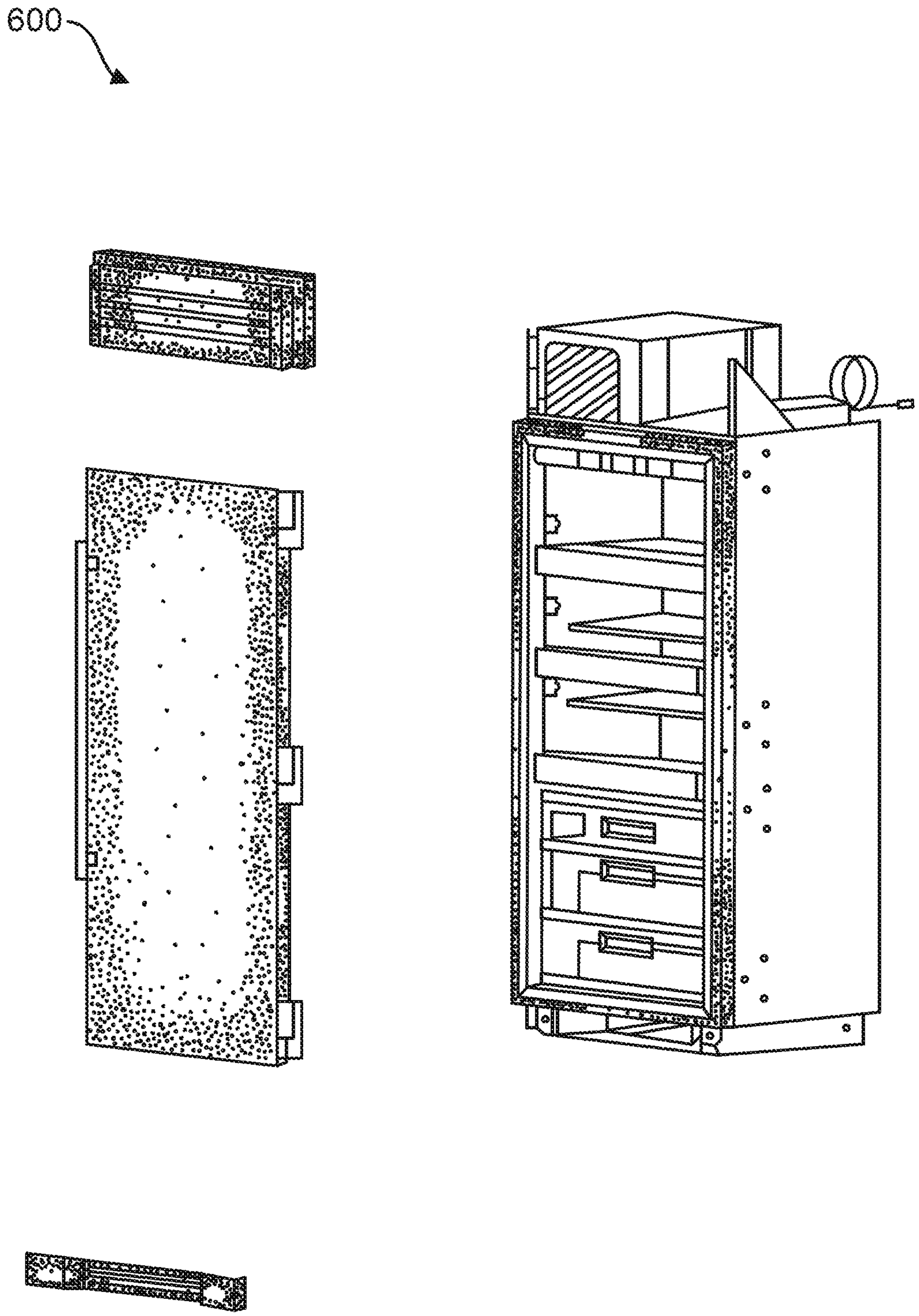
FIG. 8 is an exploded perspective of the refrigerator similar to FIG. 7, but after decorative stainless steel surfaces of the refrigerator have been painted, wherein the painted surfaces are represented as stippling in the drawing.

Referring to FIG. 5, an exemplary process of readying the painted stainless steel refrigeration appliance for first shipment to the purchaser is generally indicated at reference number 180. After curing the clear coat under heat, the partially disassembled appliance is first allowed to cool to room temperature (step 181). Once cooled, the masking is removed from the non-paint surfaces (step 182). FIG. 8 illustrates an exemplary embodiment of a stainless steel refrigerator 600 upon completion of the unmasking step 182. The refrigerator 600 is still partially disassembled, the decorative stainless steel surfaces are painted in the specified color (which is represented by stippling in the drawing), and the non-paint surfaces are unaltered. For example, the decorative stainless steel cabinet front face is painted, but the plastic thermal breaker at the inner corner of the door frame, which is immediately inboard of the painted cabinet front face, remains unpainted. Likewise, the stainless steel of the front face that is hidden behind a channel or other surface of the trim breaker remains unpainted because the method 100 applies liquid paint to a pre-assembled appliance. This would not be the case for a powder-coated appliance whose parts are powder-coated prior to assembly. It can be seen in FIG. 8 that the refrigeration system and most internal components of the prefabricated refrigerator 600 remain assembled throughout the process.

Figure 9:
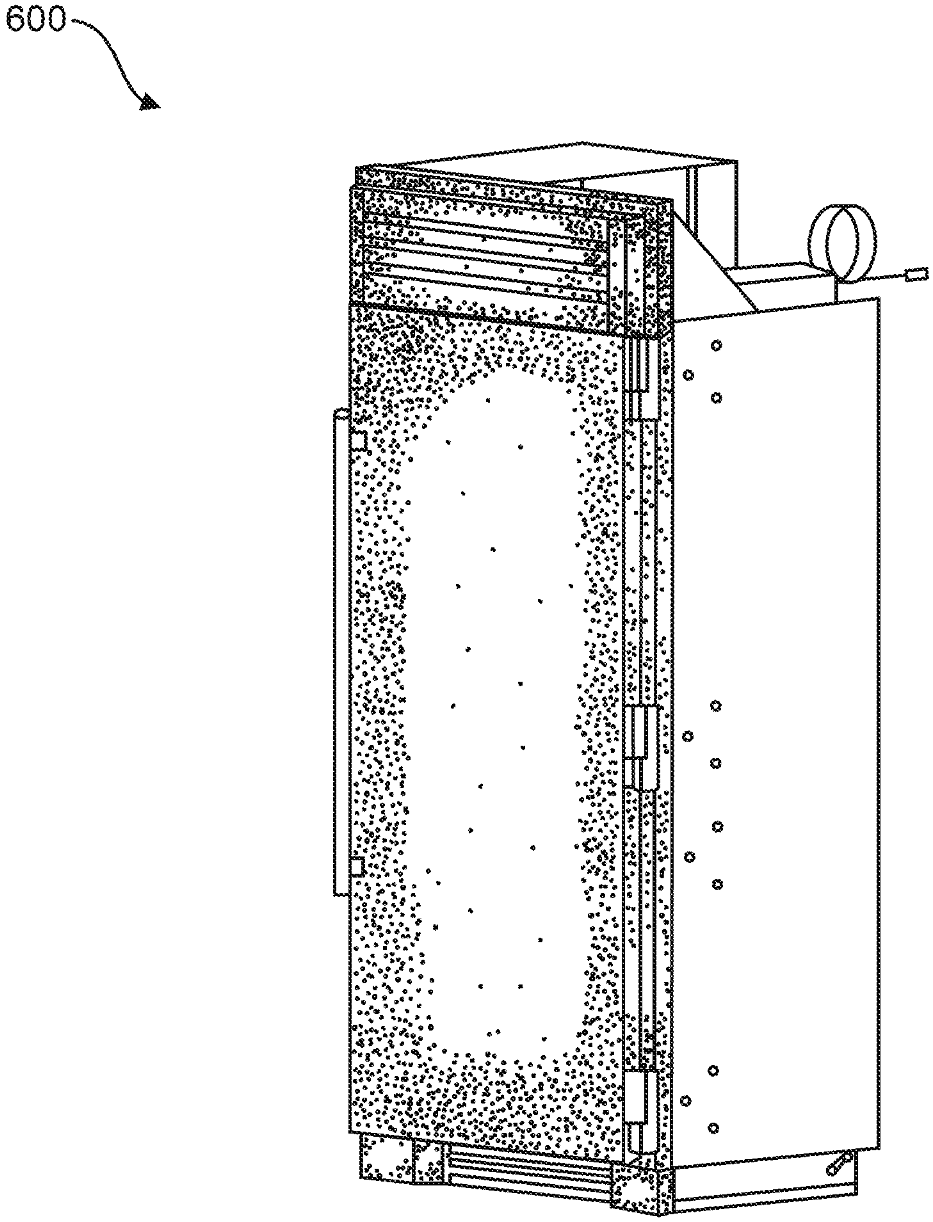
FIG. 9 is a perspective of the refrigerator of FIG. 6 after it is painted and reassembled.

After unmasking the appliance, the manufacturer reassembles it (step 183; FIG. 9) and packages it for shipment. At this point the refrigeration appliance is painted in a made-to-order, custom, color-matched color and is located at the production facility, ready to ship to the first purchaser.

Figure 10:
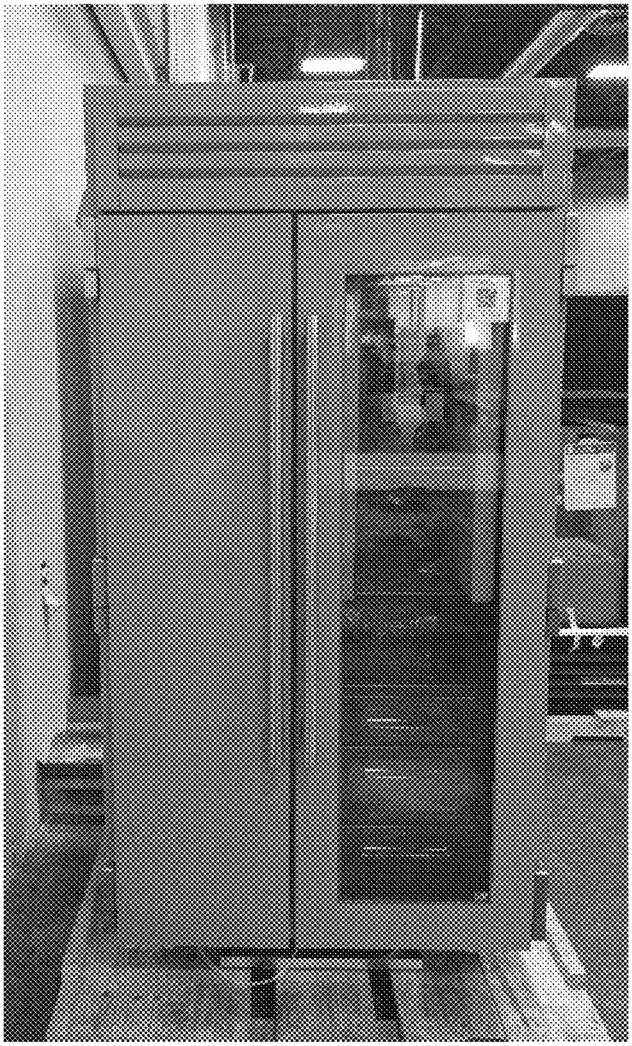
FIG. 10 is a color photograph of a side-by-side refrigerator/freezer combination made according to the method of claim 1.

FIG. 10 provides a photograph of an exemplary stainless steel refrigeration appliance 1000 manufactured in accordance with the method 100. The refrigeration appliance 1000 is a side-by-side combination refrigerator/freezer with a glass door front on the refrigeration side. The decorative stainless steel surfaces of the appliance 1000 are liquid spray painted with a custom, made-to-order pink color.

The appliance 1000 has a different coating structure than a powder coated appliance of the same type. Like a powder coated appliance, the appliance 1000 has decorative stainless steel surfaces. But unlike a powder-coated appliance, the appliance 1000 comprises liquid-applied primer, liquid-applied color-formulated paint, and liquid-applied clear coat on the decorative stainless steel surfaces. Those skilled in the art will observe that the liquid painted decorative surfaces have a depth of color and consistency that is not achievable using conventional powder coating processes. Moreover, the custom color is realized without procuring an oversized quantity of custom colored powder or reconfiguring a powder coating line for the custom color. Still furthermore, the liquid paint application process allows for various types of finishes that are not achievable with powder coating processes, such as high gloss metallic finishes of the type that are most commonly used in automotive applications.

Accordingly, it can be seen that this disclosure provides a process for manufacturing any color stainless steel refrigeration appliance wherein a liquid spray paint process is used in lieu of powder coating and color is applied to a fully prefabricated stainless steel appliance held in stock inventory. The inventors believe that the disclosed process advantageously enables a manufacturer to market its appliances in made-to-order paint finishes in a way that is economically viable. Moreover, the disclosed process can allow for precise color matching and a rich depth of color that meets the demands of the most discerning, design-focused customers.

When introducing elements of the present disclosure or the preferred embodiment(s) thereof, the articles “a”, “an”, “the” and “said” are intended to mean that there are one or more of the elements. The terms “comprising”, “including” and “having” are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A method of making a stainless steel refrigeration appliance, the method comprising:

formulating a color-formulated liquid paint to match a specified color;

preparing a prefabricated stainless steel refrigeration appliance for being painted at a production facility remote from a purchaser before shipping the prefabricated stainless steel refrigeration appliance to the purchaser, wherein said preparing the prefabricated stainless steel refrigeration appliance for being painted comprises partially disassembling a prefabricated stainless steel refrigeration appliance at a production facility remote from a purchaser to prepare the appliance for being painted before shipping the prefabricated stainless steel refrigeration appliance to the purchaser;

painting decorative stainless steel surfaces of the prefabricated stainless steel refrigeration appliance at the production facility with the color-formulated liquid paint; and readying the painted stainless steel refrigeration appliance for shipment to the purchaser.

2. The method of claim 1, wherein the step of partially disassembling the prefabricated stainless steel refrigeration appliance comprises removing one or more doors, a kick plate, a rain shield, and a cabinet header from a cabinet of the refrigeration appliance.

3. The method of claim 1, wherein said readying the stainless steel refrigeration appliance for shipment comprises reassembling the prefabricated stainless steel refrigeration appliance at the production facility after said painting.

4. The method of claim 1, wherein said preparing the prefabricated stainless steel refrigeration appliance for being painted comprises masking non-paint surfaces of the prefabricated stainless steel refrigeration appliance.

5. The method of claim 4, wherein said masking the non-paint surfaces comprises masking a plastic thermal breaker along a doorframe of the stainless steel refrigeration appliance such that there is a masking line along an edge boundary between the plastic thermal breaker and a stainless steel front cabinet face around the doorway.

6. The method of claim 1, wherein said preparing the prefabricated stainless steel refrigeration appliance comprises sanding the decorative stainless steel surfaces.

7. The method of claim 6, wherein sanding the decorative stainless steel surfaces comprises sanding the decorative stainless steel surfaces with 180-grit sandpaper.

8. The method of claim 6, wherein the said preparing the prefabricated stainless steel refrigeration appliance for being painted comprises cleaning the decorative stainless steel surfaces with a cleaning solution before sanding the decorative stainless steel surfaces.

9. The method of claim 8, wherein the step of preparing the prefabricated stainless steel refrigeration appliance for being painted comprises cleaning the decorative stainless steel surfaces with a cleaning solution after sanding the decorative stainless steel surfaces.

10. The method of claim 1, wherein the step of painting the decorative stainless steel surfaces comprises priming the decorative stainless steel surfaces using a liquid primer.

11. The method of claim 1, wherein the step of painting the decorative stainless steel surfaces comprises spraying a base coat of the color-formulated liquid paint, then allowing the base coat to flash, then spraying a control coat of the color-formulated liquid paint.

12. The method of claim 1, wherein the step of painting the decorative stainless steel surfaces comprises applying a clear coat to the decorative stainless steel surfaces after painting the decorative stainless steel surfaces with the color-formulated liquid paint.

13. The method of claim 1, wherein said readying the painted stainless steel refrigeration appliance for shipment comprises packaging the painted stainless steel refrigeration appliance.

14. The method of claim 1, further comprising receiving an order for the stainless steel refrigeration appliance in a specified color indicated by a color sample.

15. The method of claim 14, wherein said formulating a color-formulated liquid paint to match the specified color comprises using an automated color-matching system to determine an automated color-matched formula for the liquid paint based on the color sample.

16. The method of claim 15, further comprising preparing a test sample of the automated color-matched formula, evaluating the test sample of the automated color-matched formula by eye, and modifying the automated color-matched formula based on said evaluating to obtain a production color formulation for the color-formulated liquid paint.

17. The method of claim 1, wherein the step of painting further comprises heat curing the painted decorative stainless steel surfaces.

18. The method of claim 17, wherein said heat curing comprises heating the painted decorative stainless steel surfaces to a temperature of greater than 120° F.

19. The method of claim 12, wherein applying the clear coat comprises spraying a first liquid clear coat, allowing the first liquid clear coat to flash, and then spraying a second liquid clear coat.

* * * * *